Oct. 13, 1936.  L. W. LESSLER  2,057,153

MOTION PICTURE PROJECTOR

Filed March 15, 1933  5 Sheets-Sheet 1

INVENTOR.
LEW W. LESSLER.
BY
ATTORNEY.

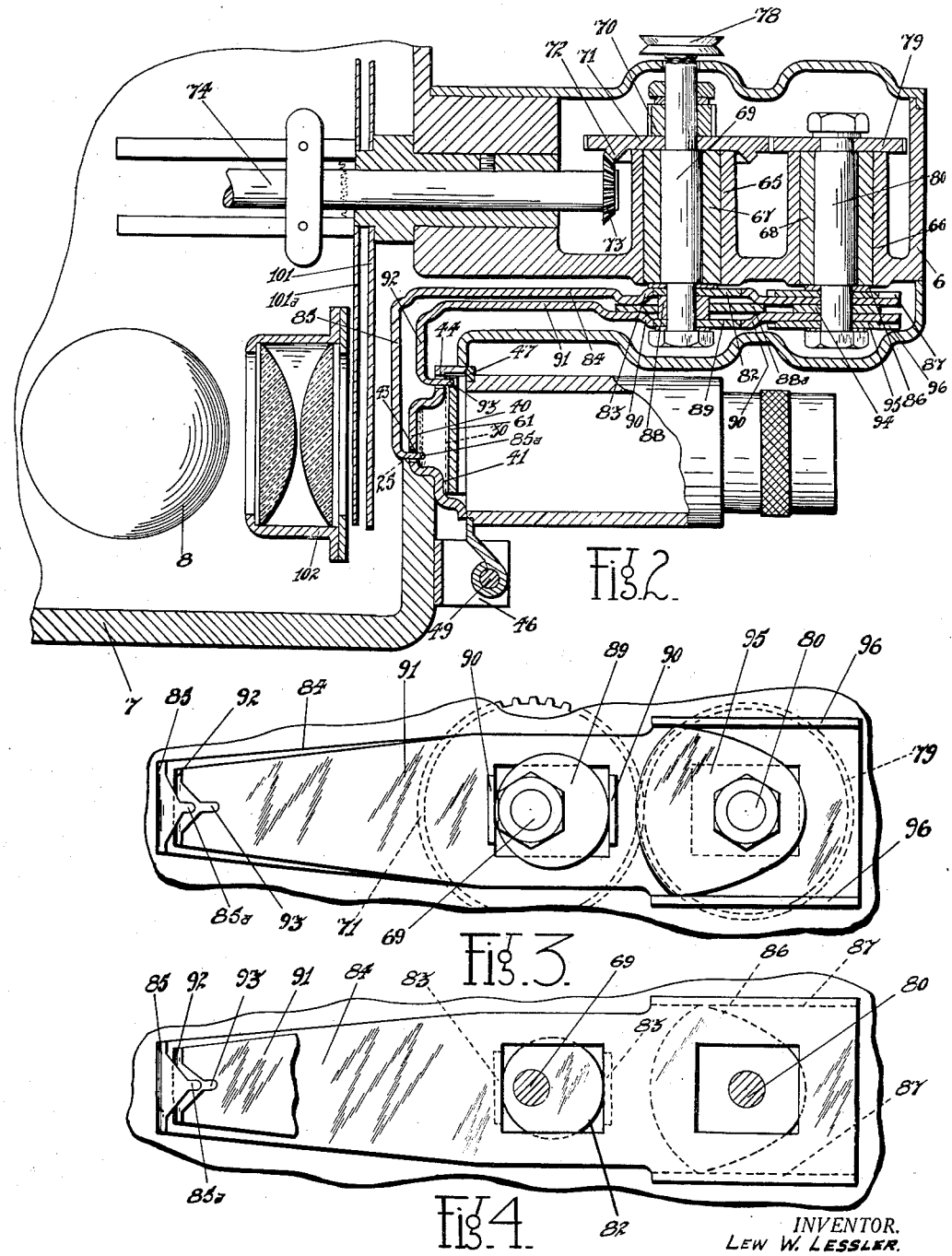

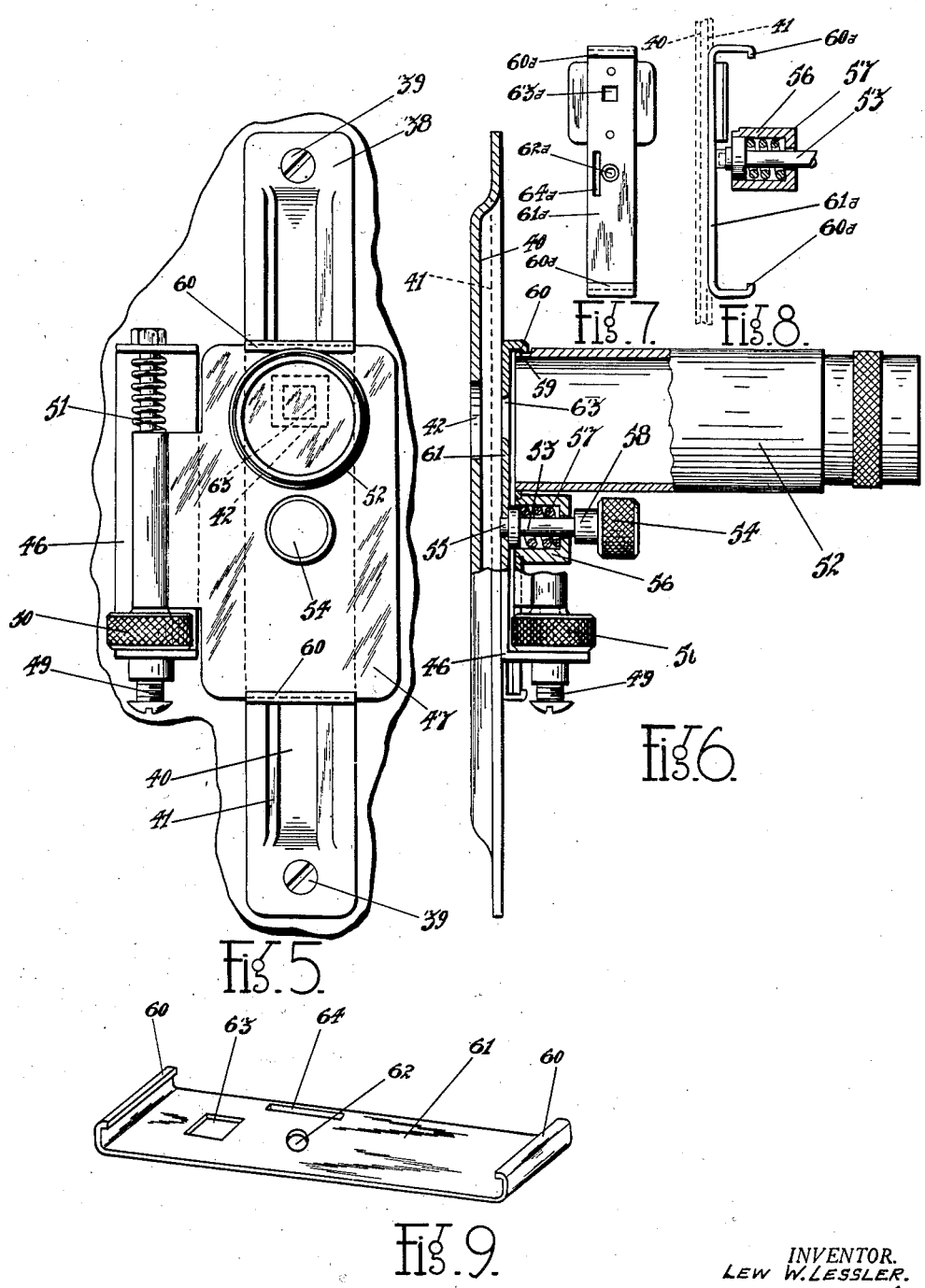

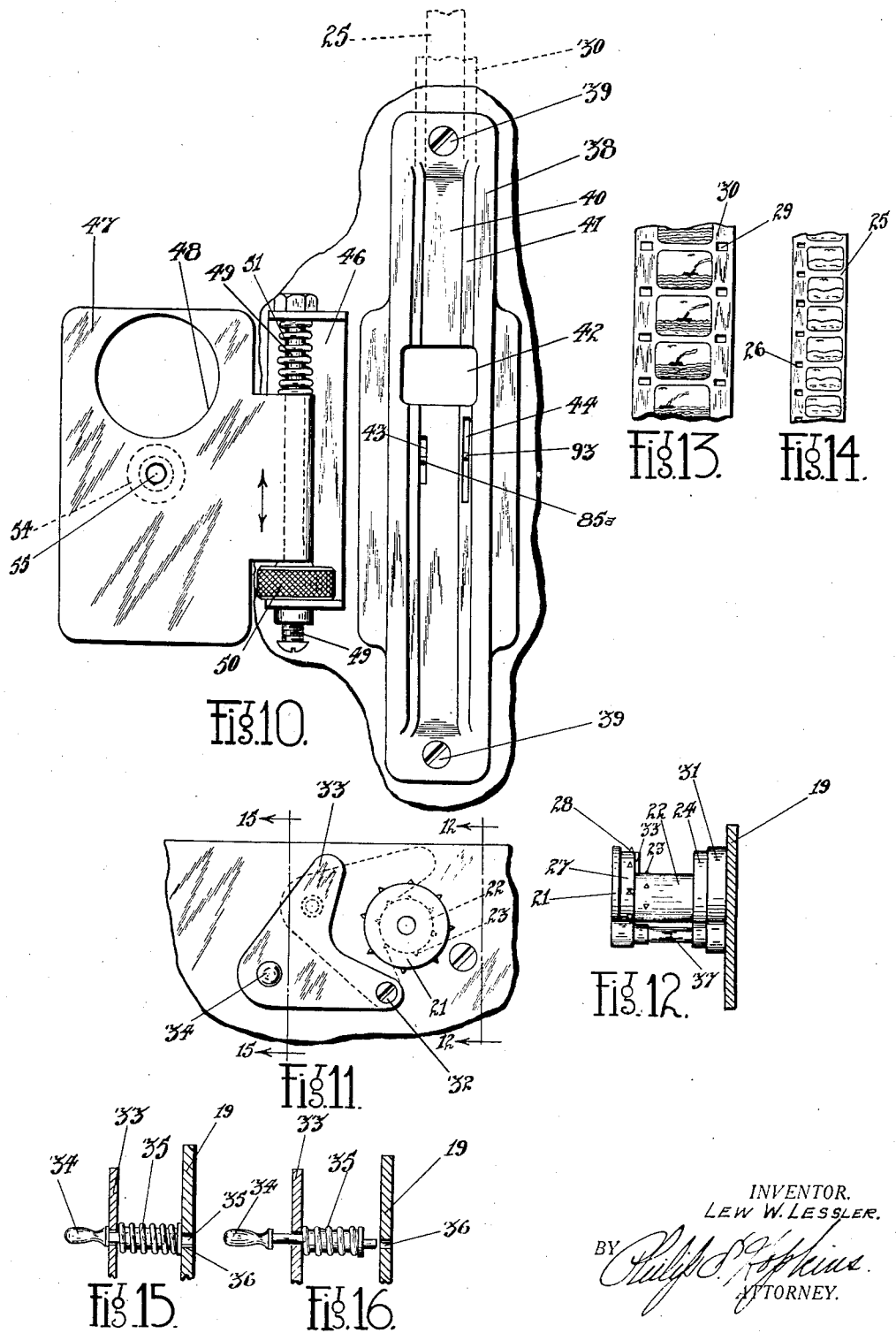

Oct. 13, 1936.  L. W. LESSLER  2,057,153
MOTION PICTURE PROJECTOR
Filed March 15, 1933   5 Sheets-Sheet 5

INVENTOR.
LEW W. LESSLER.
BY Philip S. Hopkins
ATTORNEY.

Patented Oct. 13, 1936

2,057,153

UNITED STATES PATENT OFFICE 2,057,153

MOTION PICTURE PROJECTOR

Lew W. Lessler, Johnson City, N. Y., assignor to Agfa Ansco Corporation, Binghamton, N. Y., a corporation of New York Application March 15, 1933, Serial No. 660,874

4 Claims. (Cl. 88—18.4)

My invention relates to a motion picture projector and has for its primary purpose the provision of a projector which will function with different sizes of film.

In the commercial development of motion pictures, particularly of the type for home use, there have appeared cameras and projectors adapted to operate and function with films of a certain width and with the perforations by which the film may be moved through the apparatus, spaced at a certain distance apart. Some of the cameras and projectors are adapted for a film of one size and others for a film of a different size. Likewise there are certain cameras which will operate with a film of a certain size to make two rows of exposures on such film, the film during the processing thereof being split into two films each of half the width of the original. Obviously therefore, a projector adapted to take the half size film is necessary in order to project the pictures therefrom.

The result of this development has been that a separate projector is necessary to accommodate the films of each width. This makes the motion picture equipment rather expensive for one who may have films of two different widths or sizes.

For many years the "amateur" or home use motion picture cameras and projectors have been adapted for a film of 16 m. m. width and on which the perforations are spaced a certain distance apart. More recently motion picture cameras have been introduced either for utilizing 8 m. m. film, or, as above stated, using 16 m. m. film which is subsequently split into two strips of 8 m. m. film for projection. Thus the film cost is greatly reduced as compared with the 16 m. m. size. The result is that many devotees of motion picture making find it necessary either to continue the use of the more expensive 16 m. m. apparatus and film or if they wish to take advantage of the less expensive 8 m. m. camera and film they must purchase another projector equipped for the 8 m. m. size film.

It is the object of my invention to provide a projector which will readily take both the 16 m. m. and the 8 m. m. sizes of film and thus accommodate both of these more or less standard sizes with one projecting apparatus.

It will be understood, of course, that in referring herein to "16 m. m." and "8 m. m." sizes as regards both film and apparatus, I am using these sizes merely as illustrative and not limitative for my invention is readily adaptable to whatever plurality of sizes it may be desired or which in the future development of this art may be necessary. The 16 m. m. and 8 m. m. sizes have become more or less standard as applied to home movies and these have therefore been adopted in illustrating this invention.

Another object of my invention lies in the provision of a novel dual intermittent film moving mechanism arranged to engage and intermittently move through the projector either the large or smaller size of film as may be desired.

A further object of my invention lies in the provision of a novel film gate or film guiding path adapted to receive either the small or the large sized film.

Still another object lies in the provision of a novel and readily interchangeable pressure pad device cooperating with the film gate or guiding means whereby to properly tension and guide a film of either size through the projector and past the projecting station.

Other objects and advantages in details of construction will be apparent as the description proceeds, reference now being had to the figures of the accompanying drawings forming a part of this application and wherein like reference numerals indicate like parts.

In the drawings:

Figure 2 is a detail cross sectional view through the operating mechanism of the projector and illustrating the intermittent film moving means.

Figure 3 is a detail view illustrating the intermittent and film moving levers or claws.

Figure 4 is a view similar to Figure 3 but with one of said intermittent claw levers broken away to illustrate the arrangement of the other claw lever.

Figure 5 is a detail front plan view of the combination film gate and with the pressure pad and lens carrier in operative position.

Figure 6 is a detail side view partly in section of the film gate mechanism.

Figure 7 is a detail front plan view of one of the pressure pads for use on the film gate.

Figure 8 is a side view thereof.

Figure 9 is a detail perspective view of the other of the pressure pads.

Figure 10 is a view of the film gate similar to Figure 5, but with the lens carrier swung out of operative position.

Figure 11 is a detail view illustrating the film retaining device in cooperation with the film sprocket.

Figure 12 is a front detail view of a combination sprocket adaptable for use on my projector, taken on the line 12—12 of Figure 11.

Figure 13 illustrates one size of film for which my projector is adapted.

Figure 14 illustrates the second or smaller size of film for which my projector is adapted.

Figure 15 is a detail view illustrating the locking means for the film retaining device taken on the line 15—15 of Figure 11.

Figure 16 is a similar view showing the operation thereof.

Figure 1:
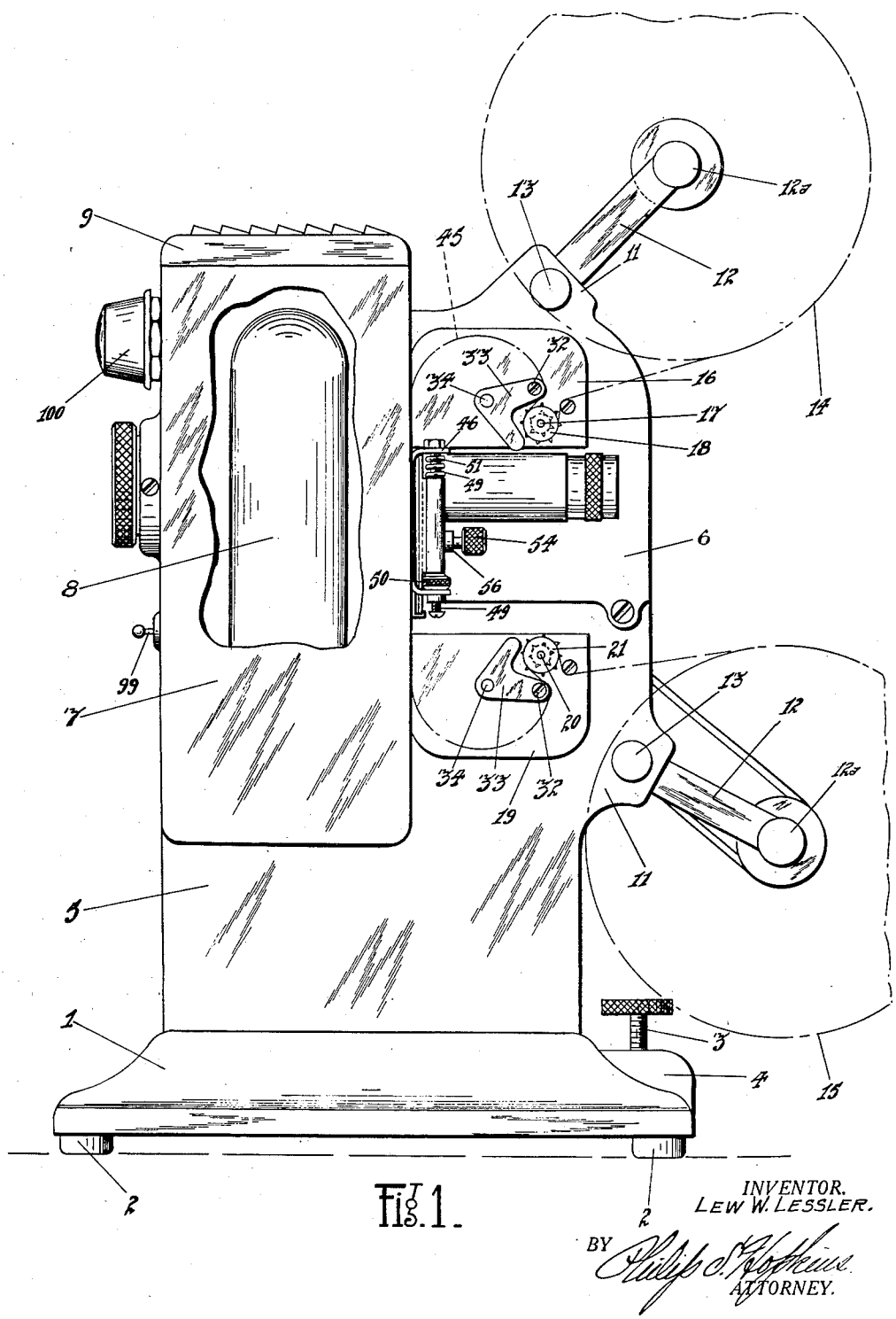
Figure 1 is a side view of my projector illustrating the general arrangement of parts.
Figure 17:
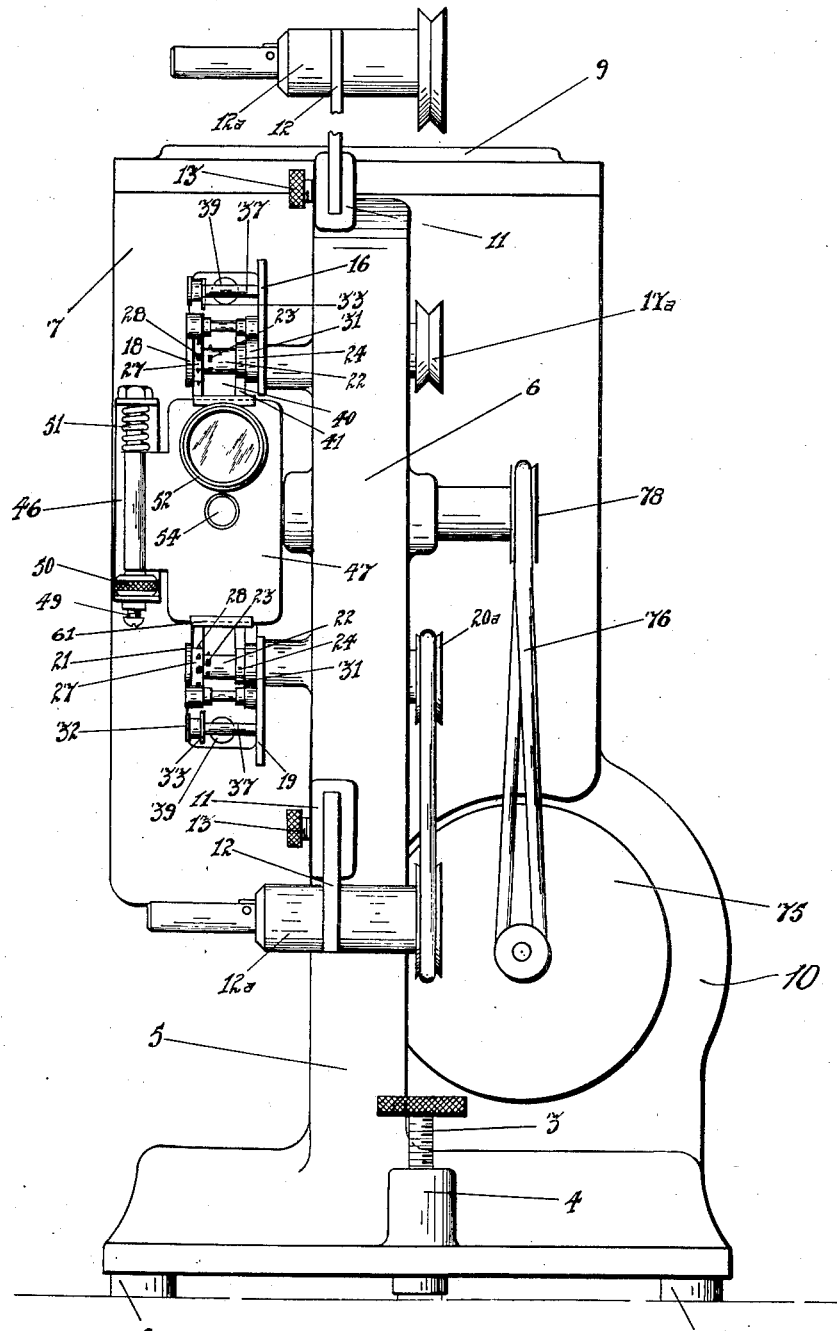
Figure 17 is a front view of the projector.

With reference now more specifically to the figures of the drawings, the reference character 1 refers to a supporting base for the projector provided with suitable feet 2 and with the adjusting screw 3 suitably threaded through an enlarged boss 4 on the base 1 and adapted to engage the table or other support upon which the projector is placed whereby to adjustably tilt the projector to change the angle of projection.

Extending upwardly from the base 1 and preferably integral therewith is a supporting plate 5 provided at its front edge with the flange 6 for a purpose to be described. Preferably cast integral with this supporting plate 5, adjacent its rear edge and spaced above the base 1 is a housing 7 adapted to receive the projecting lamp 8 and other elements hereinafter described. This housing 7 is provided at its top with the removable ventilated cover 9.

This housing 7 extends on each side of the supporting plate 5 and is integrally connected at one lower corner with the base 1 by means of the hollow housing 10 communicating with the interior of the housing 7.

Slidably and adjustably mounted through slotted bosses 11 provided in the flange 6 of the supporting plate 5 are reel supporting arms 12 adapted to be locked in any adjusted position by the lock screws 13. The upper arm 12 is adapted to receive the supply reel 14, and the lower arm is adapted to receive the take up reel 15, said arms being provided with reel spindles 12a of any desired form for receiving and holding the hubs of the film reels.

Suitably mounted upon the supporting plate 5 in front of the lamp housing 7 is a plate 16 through which extends the shaft 17 of a sprocket member 18. Likewise supported on the supporting plate 5 and spaced below the plate 16 is a second plate 19 through which projects the shaft 20 of the sprocket member 21.

As shown clearly in Figure 12 the sprocket members 18 and 21, which are identical, comprise a reduced hub portion 22 upon which are provided sprocket teeth 23 properly spaced from the enlarged shouldered portion 24 on said hub, and adapted to receive the small size film 25 such as shown in Figure 14. This size film is usually provided with but one row of perforations 26 which are arranged along one edge of the film for engagement by the teeth 23. The shouldered portion 24 on the hub 22 provides a guide for the opposite edge of the film. The outer end of the hub 22 is enlarged as at 27 and is of the same diameter as the shouldered portion 24. This enlarged portion 27 is provided with sprocket teeth 28 adapted to engage the perforations 29 along one edge of the larger sized film 30 shown in Figure 13 whereby such film may be moved by the sprocket. The opposite edge of the large size film 30 is supported by the shouldered portion 24 and is guided by the second shouldered portion 31 provided on the sprocket hub. Thus there is provided a combination sprocket which readily supports for feeding either of two sizes of film.

Pivoted to the plates 16 and 19 adjacent the sprockets 18 and 21, as at 32, are the film retaining members 33 provided with finger pieces 34 comprising the ends of spring pressed pins 35 adapted to engage selectively in openings 36 in the plates 16 and 19 whereby the retaining members 33 may be fixed and retained in either of the adjusted positions shown in Figure 11. It will be obvious, of course, that if the smaller sized film is threaded around the sprockets, the retaining members 33 will be rocked to the position shown in dotted lines in Figure 11 bringing the edge of such retaining members into position closely adjacent the film as it passes around the sprocket, thus preventing its being inadvertently pulled away from the sprocket except over the roller 37 provided on the pivot pin 32 and over which the film is drawn from the sprocket. When the larger size film is used the retaining members 33 will be rocked to the full line position shown in Figure 11 and in which position they cooperate with the larger size sprocket portions in the same manner.

Disposed upon the front wall of the housing 7 is a channelled guide plate 38 secured as by screws 39, and which plate is provided with two guide channels 40 and 41 respectively of different widths to receive films of different widths. This guide plate 38 is suitably disposed within an elongated opening provided in the front wall of the housing 7 and is provided at a point in alignment with the lamp 8 in the housing with an opening 42. The plate 38 is also provided with the slot 43 in the channel 40 and with the slot 44 in the channel 41. (Figure 10.) These slots are for a purpose to be described.

This guide plate 38 is positioned at right angles to and between the sprockets 18 and 21 and constitutes the fixed portion of the film gate through which the film travels past the opening 42 comprising the projection aperture. The dotted line 45 in Figure 1 illustrates the path of the film as threaded through the projector. Pivoted to a fixed plate or bracket 46 on the front wall of the housing 7, directly adjacent to the guide plate 38, is a lens carrier 47 provided with an opening 48 registering with the opening 42. (Figure 10.) The pivot pin 49 for this lens carrier is preferably threaded and provided thereon is a finger piece 50 disposed between the lower end of the bracket 46 and the pivoted portion of the carrier 47 whereby said carrier may be adjusted up or down for the purpose of framing. A coil spring 51 is positioned between the upper flange of the bracket 46 and the lens carrier whereby it is normally urged downwardly against the adjusting finger piece 50.

This lens carrier 47 is provided on its front surface with the lens mount 52 and is, of course, provided with any suitable friction locking means whereby when the lens carrier is swung in cooperative relation with the film gate plate 38, as shown in Figure 2, it will be retained in such position.

Also mounted upon the lens carrier 47 and centrally thereof is a spring pressed pin or plunger 53, (Figure 6), provided on its outer end with a knurled finger piece 54 and at its inner end with a shouldered reduced portion 55. A bushing or housing 56 is provided on the carrier plate 47 encircling the pin 53 and within this bushing is disposed a coil spring 57 also encircling the pin 53 and normally urging it forwardly through the carrier plate 47. The pin is, of course, limited in its forward movement by the flanged shoulder portion 58 adjacent the finger piece.

The top and bottom edges of the lens carrier plate 47 are flanged or grooved as at 59 to slidably receive the flanged upper and lower ends 60 of one of the pressure pads 61 or 61a adapted to be slidably mounted upon the lens carrier plate and provided substantially centrally with openings or recesses 62 and 62a respectively, adapted to receive the reduced end 55 of the pin 53 whereby the pressure pad in use is normally urged outwardly away from the carrier plate 47, it being limited in such outer movement by the interengaging grooves and flanges 59 and 60. In such position the pressure pad in use is obviously resiliently mounted against the tension of the coil spring 57 on the pin 53.

Obviously with a pressure pad so mounted and with the lens carrier plate 47 swung to closed position with respect to the film guide plate 38, the pressure pad will be disposed in film engaging position whereby to tension the film in its passage through the gate and past the projection aperture 42.

The pressure pad 61 is provided with an opening 63 which when the pad is in position on the lens carrier, is in registry with the projection aperture 42. The pressure pad 61 is also provided with an elongated slot 64 adapted for alignment with the slot 44 in the film guide channel. The pressure pad 61a is provided with an opening 63a, corresponding to opening 63, and with a slot 64a for registry with the slot 43, also with flanges 60a corresponding to flanges 60.

It may be stated here that two of these pressure pads are provided with each projector, one, 61a, of a width adapted to enter the smaller channel 40 for effective cooperation with the small sized film, and the other, 61, of a width adapted to enter the channel 41 for cooperation with the large sized film. The sizes of the openings 63 and 63a and the position and length of the slits 64 and 64a, of course, conform to the sizes of the films 25 and 30. As has been described, these pressure pads are readily removable from the lens carrier and the pads may be substituted one for the other with ease and facility depending upon which size of film is being used in the projector. It may be noted here that this substitution of pressure pads is the only substitution necessary in changing from one size of film to the other.

Figures 7 and 8 illustrate the pressure pad for the small size film and for cooperation with the smaller channel 40. In Figures 6 and 9 the larger size pressure pad is illustrated for use with the large size film and the wider channel 41. The ready interchangeability of these pressure pads in cooperation with the two sizes or widths of channel guides renders the projector easily adaptable for films of the two different sizes or widths.

Referring now more particularly to Figures 2, 3, and 4, it will be observed that the supporting plate 5 is provided with a pair of hollow bearings 65 and 66 within which are mounted bushings 67 and 68. Rotatably mounted within the bushing 67 is a shaft 69 provided with a pinion 70 and adjacent to which is mounted in fixed relation to the shaft 69 a gear 71. Provided on the inner surface of the gear 71 is a spiral gear 72 meshing with which is a bevel gear 73 on a shaft 74. The opposite end of the shaft 69 is provided with a pulley 78 having belt connection 76 with the pulley 77 on the shaft of motor 75.

The gear 71 meshes with a smaller gear 79 mounted upon a shaft 80 journaled within the bushing 68.

The opposite end of the shaft 69 has fixed thereon for rotation therewith the cam 82 engageable at its edge with the flanges 83 provided substantially centrally of a claw member 84. This claw 84 extends into the housing 7 and is bent angularly as at 85 to a point in alignment with the slot 43 in the channel 40, at which point this end of the claw is provided with an inwardly bent film engaging finger 85a adapted to pass through the slot 43 into film engaging position. Obviously rotation of the shaft 69 and of the cam 82 within the flanged portion 83 of the claw causes the claw to reciprocate longitudinally whereby to intermittently move the film engaging finger 85a into and out of the slot 43.

Mounted upon the shaft 80 for rotation therewith is a cam 86 engageable with the flanges 87 provided at the upper and lower edges of the claw member 84 adjacent its rear end. Obviously rotation of the shaft 80 and of the cam 86 will result in rocking the claw member 84 about the shaft 69 as a pivot whereby the film engaging finger 85a is moved up and down longitudinally of the slot 43. The gear ratio, determined by the size of the gears 71 and 79, is such that the relation of the rocking movement of the claw to the sliding movement thereof is 2 to 1 whereby the claw will engage and move the film downwardly once to every two vertical movements of the claw. This arrangement leaves the film in projecting position a greater length of time and thus tends to increase the illumination and reduce flicker.

Also mounted upon the shaft 69 for rotation therewith, and spaced from the cam 82 by the spacing washers 88 and 88a, is a second cam 89 engaging the flanges 90 provided on a second claw member 91, this claw extending substantially parallel with the claw 84 and having also an angular portion 92 and the angular film engaging finger 93 cooperating with the slot 44 in the film guide channel 41. Obviously rotation of the shaft 69 and of the cam 89 results in reciprocation longitudinally of the claw 91 whereby to intermittently move the film engaging finger 93 into and out of film engaging position.

Also mounted upon the shaft 80 and spaced from the claw member 84 by the spacing washer 94 is a cam 95 positioned to engage the upper and lower flanges 96 provided on the claw member 91 whereby upon rotation of the cam 95 the claw member 91 will be rocked about the shaft 69 as a pivot whereby to move the film engaging fingers 93 up and down with relation to the slot 44. The same gear ratio, of course, applies between the sliding and rocking movements of the claw 91, as above described for the claw 84 and both claws, as is obvious, operate simultaneously. The claw members are cut out, of course, around the shafts 69 and 80 to permit the longitudinal sliding movement under the influence of the cams 82 and 89.

It will be clear from the foregoing that regardless of whether the small or large size of film is used, the film moving mechanism is effective to move the same intermittently through the film gate and past the projection station. If the small size film is used it lies within the channel guide 40 entirely independent of the claw 91 and is actuated only by the claw 84 with its film engaging finger 85a. If the large size film is used, it lies within the channel 41, which, as shown clearly in Figure 2, is spaced adequately from the channel 40 so as to be entirely independent of the finger 85a of the claw 84 and is actuated only by the fingers 93 of claw 91.

A switch member for the motor 75 is provided conveniently at 99 on the rear side of the housing 7, as is also a rheostat control member 100 for the speed of the motor 75.

Mounted upon the shaft 74 is the usual shutter 101 operatively disposed between the projector aperture 42 and the lamp 8. A suitable fire shutter 101a of suitable design is also mounted on said shaft 74. Also mounted within alignment between the lamp 8 and the projector aperture 42 is a suitable condenser lens unit 102 whereby the light from the lamp 8 may be properly focused upon the film as it passes through the film gate.

The main drive for the projector mechanism is, of course, from the motor 75 through pulley 77, belt 76 and pulley 78 to the shaft 69. As shown in dotted lines in Figure 18, there is provided suitable gear driving means from the pinion 70 on shaft 69 to the sprocket shafts 17 and 20. These sprocket shafts have the pulleys 17a and 20a respectively thereon for belt driving connection to the film reels.

In use it will be clear that the operator after threading the film around the upper sprocket 18 and through the guide plate 38, around the lower sprocket 21, and attaching the end thereof to the take up reel 15, adjusts the film retaining members 33 to their proper position depending upon whether the film is the wide or narrow size. The pressure pad appropriate to the size of the film being used is then mounted upon the lens carrier plate 47, the same being centered thereon by means of the spring pressed pin 53 engaging in the opening 62 in the pressure pad. The lens carrier and pressure pad are then swung to closed position and the projector is ready to operate.

Of course, changes may be made in details of construction and arrangement of parts without departing from the spirit and scope of my invention. I do not limit myself, therefore, to the exact form herein shown and described other than by the appended claims.

I claim:

1. An intermittent film moving mechanism comprising a gate consisting of a channel shaped member, the side walls of which are formed outwardly in a plane spaced from the inner wall thereof whereby to provide inner and outer parallel spaced film guides of different widths, said inner wall having an opening therethrough and one of said outwardly formed side walls having an opening therethrough, a pair of separate claw bearing members movably mounted with respect to said gate and each bearing a film engaging claw adapted to perform its feed stroke simultaneously with the other in their respective openings, and separate driving means for moving each claw member for imparting different length feed strokes simultaneously thereto.

2. Film moving mechanism comprising a film gate consisting of a channel shaped member having an opening therethrough for picture projection, the sides of said member being formed to selectively support in parallel spaced positions the edges of films of different widths for movement past said opening, a pair of separate claw bearing members movably mounted with respect to said gate and each bearing a film engaging claw adapted to perform its feed stroke simultaneously with the others, one of said claws extending through an opening in said gate in a position to engage and move a film of one width, the other of said claws extending through an opening in said gate in a position to engage and move a film of a different width, and separate driving means for each member for simultaneously imparting different length feed strokes to said claws.

3. Film moving mechanism comprising a film gate having an opening for picture projection, said gate being formed to provide two parallel spaced film guides for selectively supporting the edges of two films of different widths, each of said edge supports having a film claw opening of a different length than the other, a pair of separate claw bearing members movably mounted with respect to said gate and each bearing a film engaging claw adapted to perform its feed stroke simultaneously with the other in their respective openings, and separate driving means for each claw member for imparting different length feed strokes simultaneously thereto.

4. Film moving mechanism comprising a film gate having an opening for picture projection, said gate being formed to provide two parallel spaced film guides for selectively supporting the edges of two films of different widths, each of said edge supports having a film claw opening of a different length than the other, a pair of separate claw bearing members movably mounted with respect to said gate and each bearing a film engaging claw adapted to perform its feed stroke simultaneously with the other in their respective openings, and separate driving means for each claw member for imparting different length feed strokes simultaneously thereto, and a pair of film pressure plates of different widths and each having a light opening of different size than the other, selectively engageable against a film in said gate.

LEW W. LESSLER.